Patented Mar. 27, 1923.

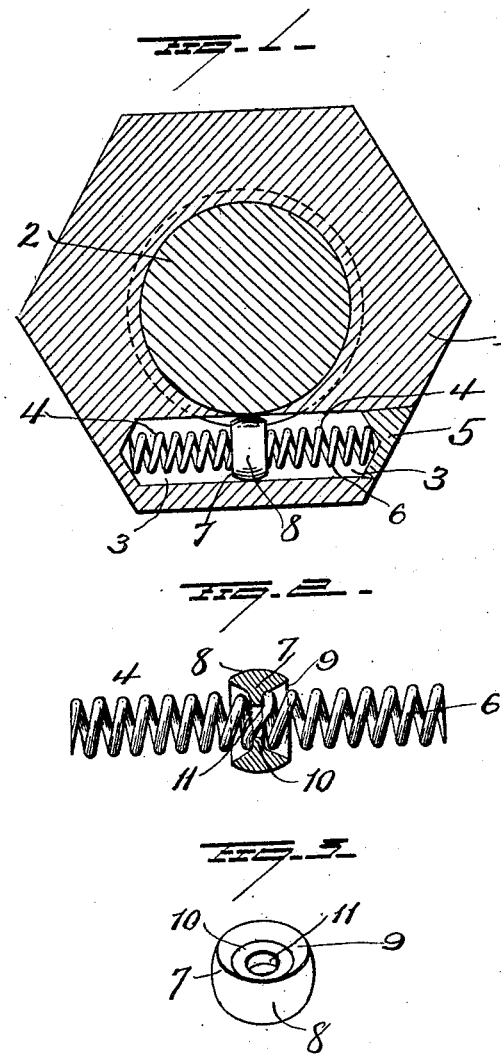

1,450,066

UNITED STATES PATENT OFFICE.

ETHAN I. DODDS, OF CENTRAL VALLEY, NEW YORK, ASSIGNOR TO FLANNERY BOLT COMPANY, OF PITTSBURGH, PENNSYLVANIA.

LOCK NUT.

Application filed April 27, 1921. Serial No. 464,938.

*To all whom it may concern:*

Be it known that I, ETHAN I. DODDS, a citizen of the United States, and a resident of Central Valley, in the county of Orange and State of New York, have invented certain new and useful Improvements in Lock Nuts; and I do hereby declare the following to be a full, clear, and exact description of the invention, such as will enable others skilled in the art to which it appertains to make and use the same.

This invention relates to improvements in lock nuts, one object of the invention being to provide a nut with simple and efficient locking means, and to so construct said locking means that it shall comprise a spring and a lug or obstacle secured to and carried by said spring in such manner as to permit the nut to be freely screwed onto a threaded bolt but which will so cooperate with the threaded bolt as to prevent backward turning of the nut under normal conditions, the construction being such that when a vigorous backward turning force is applied to the nut, the locking action of the lug or obstacle will be overcome and the free backward turning movement of the nut permitted.

With this and other objects in view, the invention consists in certain novel features of construction and combinations of parts as hereinafter set forth and pointed out in the claims.

In the accompanying drawings, Figure 1 is a sectional view showing an application of my improvements; Figure 2 is an enlarged sectional view showing the spring and the obstacle secured thereto, and Figure 3 is a perspective view of the obstruction.

1 represents a nut and 2 a threaded bolt on which the nut is screwed.

The nut 1 is provided with an elongated chamber or bore 3 which is so located that it will be approximately tangential to the bore of the nut and so that its intermediate portion will intersect a thread or threads in the nut and cut through the same. A locking device 4 including a spring is located in the chamber 3 and said spring bears at one end against one end of said chamber. The other end of the spring bears against a closure 5 for the chamber or bore 3 and said spring is kept normally under a degree of compression.

In the embodiment of my invention shown in the drawings, the locking device comprises a coiled spring 6 on which an obstacle 7 is threaded. This obstacle may consist of a lug which may have a circular form with a rounded outer face 8, and this lug or obstacle may be made with diametrically opposite recesses 9 forming a comparatively thin central web 10 having a hole 11 for the passage of the wire of the spring. The obstruction 7 will be threaded on the spring until it shall occupy a position approximately midway between the ends of said spring, when it will be permanently secured to the latter, and this may be accomplished by pinching or compressing the wire of the spring with the use of a suitable tool, so that it will tightly clamp the web 10 of said obstacle, or the permanent connection of the obstacle to the spring may be accomplished by welding if desired. When the locking device is in position in the chamber 3 of the nut 1, the lug or obstacle will normally occupy a position coincident with the intersection of said chamber with the threaded interior of the nut, so that when the nut is screwed onto the bolt 2, the thread on the latter will cause the obstacle 7 to so move in the chamber as to become disposed to one side of the point of intersection of the chamber 3 with the threaded interior of the nut and thus permit the latter to turn forwardly on the bolt. The obstacle will then be so disposed however, that it will bind between the thread of the bolt and the opposite wall of the chamber 3 and thus resist backward turning of the nut. Should it be desired to remove the nut from the bolt, this may be accomplished by applying a vigorous turning force to the nut and thus cause the obstacle to be forced past the thread of the bolt which it engaged and become disposed at the opposite side of that portion of the chamber 3 which intersects the threaded interior of the nut, and then the nut may be unscrewed from the bolt.

Having fully described my invention what I claim as new and desire to secure by Letters Patent, is:—

1. A lock-nut having a chamber intersecting its threaded interior, and a locking device enclosed in said chamber, said locking device consisting of a spring and an obstacle permanently secured to an intermediate portion of said spring and normally occupying a position in said chamber where the latter intersects the threaded interior of the nut.

2. A lock-nut having a chamber intersecting its threaded interior, and a locking device located in said chamber, said locking device comprising a coiled spring and an obstacle having a hole for the passage of the wire of said spring, said obstacle occupying a position intermediate the ends of said spring and permanently secured thereto, and said obstacle normally occupying a position in said chamber where the latter intersects the threaded interior of the nut.

3. A lock-nut having a chamber intersecting its threaded interior, and a locking device in said chamber, said locking device comprising a coiled spring, an obstacle having a contracted central web provided with a hole for the passage of the wire of the spring, the wire of the spring bent to grasp said web and secure the obstacle to the spring with the obstacle normally occupying a position in said chamber where the latter intersects the threaded interior of the nut.

In testimony whereof, I have signed this specification in the presence of a subscribing witness.

ETHAN I. DODDS.

Witness:
   EDWIN S. RYCE.